H. COTTRELL.
Machines for Cutting and Working Stone.

No. 144,316. Patented Nov. 4, 1873.

Witnesses.
John Bulkey
W. E. Chaffee

Inventor.
Herbert Cottrell
by atty J. Pollok

AM. PHOTO-LITHOGRAPHIC CO. N.Y. (OSBORNE'S PROCESS)

UNITED STATES PATENT OFFICE.

HERBERT COTTRELL, OF NEWARK, NEW JERSEY.

IMPROVEMENT IN MACHINES FOR CUTTING AND WORKING STONE.

Specification forming part of Letters Patent No. 144,316, dated November 4, 1873; application filed July 29, 1873.

*To all whom it may concern:*

Be it known that I, HERBERT COTTRELL, of Newark, Essex county, New Jersey, have invented certain new and useful Improvements in Machines for Cutting and Working Stone, of which the following is a specification:

The machine hereinafter described is designed to use rotary diamond or carbon-armed tools to cut stone. My object has been to adapt the machine to square the stone or cut it to any angle; to cut or form ornamentations in or on the stone; to turn columns and to flute the same; to cut posts or columns to particular angles, viz., rectangular, octagonal, hexagonal, &c., and to perform many other kinds of work necessary in shaping or cutting stone.

I employ a tool-carrying frame, combined with feed mechanism, adapted to move said frame in any desired direction, and also a carriage provided with an upright stone-carrying plate, adapted to be set nearer to or farther from the tool, as desired, as well as to be turned on a vertical axis to adjust its upright face at any required angle with respect to the tool. The said supporting-plate also is provided with adjustable and detachable centers, similar to those in a turning-lathe, to be used in turning columns and for like work.

The nature of my invention and the manner in which the same is or may be carried into effect will be understood by reference to the accompanying drawing, in which—

Figure 1:
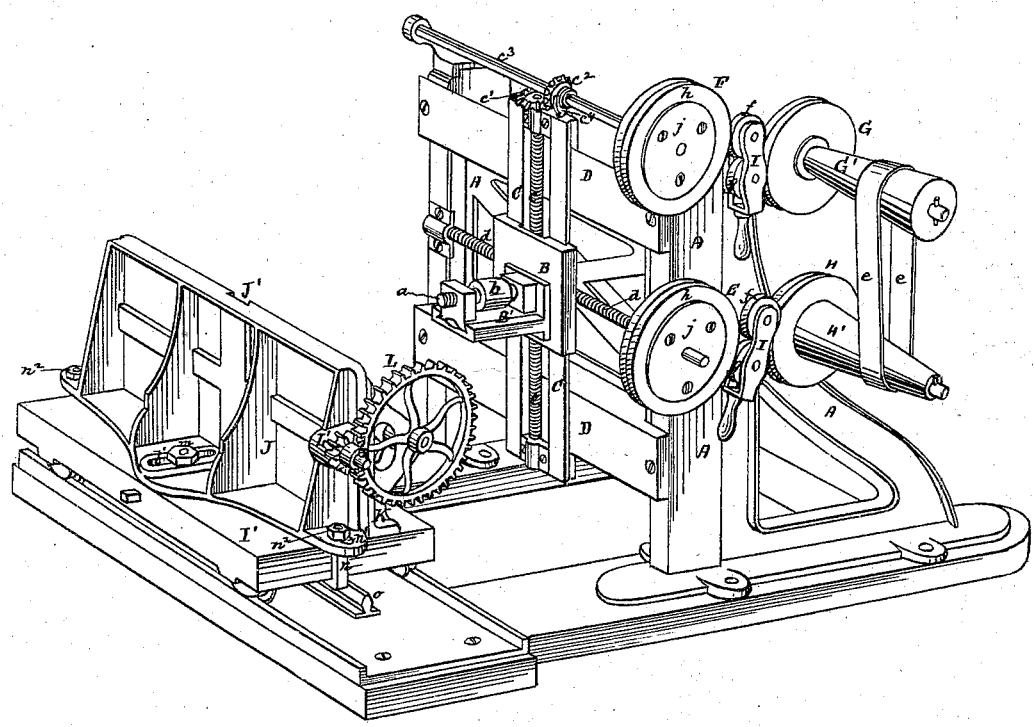
Figure 2:
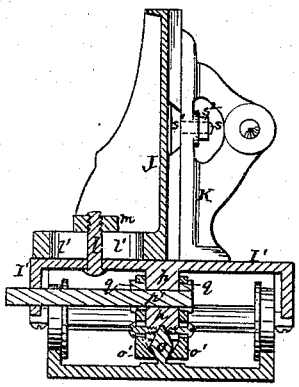
Figure 3:
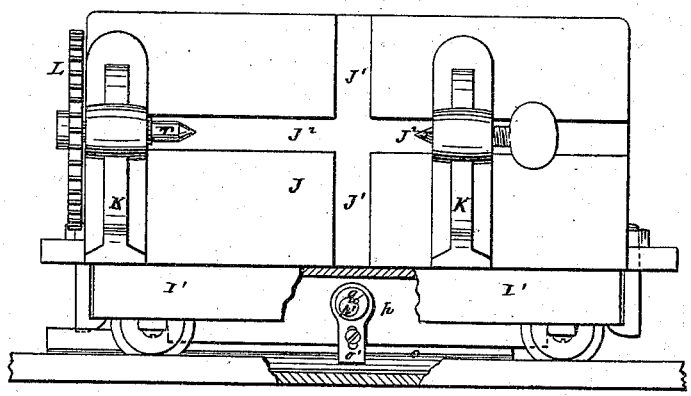
Figure 4:
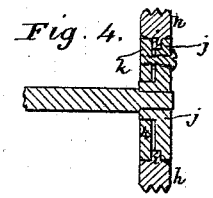

Figure 1 is a perspective view of my improved machine. Fig. 2 is a transverse vertical central section of the carriage and stone-supporting plate. Fig. 3 is a front elevation of the same. Fig. 4 is a transverse section through the axis of one of the feed or tension pulleys.

The cutting and feeding mechanisms are mounted in a frame, A, of suitable structure. B is the tool-carrier, provided with a horizontal shelf or plate, B', on which is mounted, in suitable bearings, the mandrel $a$, on which the diamond-armed cutting-tool is to be mounted. This mandrel or shaft is to be rotated at a high velocity by belting passing from the prime mover over pulley $b$ on said mandrel, or it may be revolved by other suitable means. The carrier B has a dovetailed groove on its rear face, the edges of which overlap and engage the vertical correspondingly-shaped edges of a movable frame or carriage, C. The carrier B slides up and down on frame C, being actuated by a vertical screw-threaded shaft, $c$, which is supported in end bearings in frame C, and passes through a screw-threaded bearing or sleeve on the rear side of carrier B. Frame C has a horizontal sliding movement, being for this purpose held to and supported on guides D on frame A. The movement of the frame is derived from a horizontal screw-threaded feed-shaft, $d$, which is supported in suitable bearings on frame A, and passes through a screw-threaded bearing or sleeve on frame C. Feed-shaft $d$ is driven by the feed or tension pulley E, mounted on one of its ends, and feed-shaft $c$ derives its movement from a beveled gear, $c^1$, on its upper end, engaging a like gear, $c^2$, which is mounted on a shaft, $c^3$, supported in bearings on top of frame A. The gear $c^2$ is united with its shaft by a spline-and-groove connection to permit the gear to slide lengthwise of the shaft while rotating with it. A clutch, $c^4$, on the frame C, embracing a grooved hub on gear $c^2$, forces the latter to slide with the frame C. The shaft $c^3$ is rotated by a tension or feed pulley, F. Pulleys E F derive their movements from pulleys G H, connected together by belting $e$ passing around reversed cones G' H' fixed to the axes of said pulleys G H, one of them being driven by power taken from a suitable source. The cones enable a variable speed to be imparted to the pulleys G H, which is imparted by them to the feed or tension pulleys, so that the speed of the one may be varied relatively to that of the other, for the purpose of regulating the direction in which the tool is moved by the feed. Between the feed-pulleys and driving-pulleys are reversible frogs I, one for each set of pulleys, carrying each a pair of transmitting-pulleys, $f$ $g$, which are in contact, so that the rotation of one will rotate the other. The frogs are pivoted to the frame A on a horizontal axis between the two pulleys $f$ $g$. If either frog be tilted to bring the upper pulley $f$ in contact with its tension-pulley, as indicated in the upper set of pulleys in Fig. 1,) and the lower one, $g$, in contact with its driving-pulley, then the tension-pulley will be revolved in one direction. By tilting the frog so as to reverse the position of the pulleys $f$ $g$, as indicated in the lower set of pulleys in Fig. 1, then the revolution of the tension-pulley will be in the opposite direction. Thus the direction of movement of either the horizontal or vertical feed can be changed at pleasure; or either can be arrested by bringing the frog that controls that feed in such position that it will engage neither its tension nor its driving pulley.

The several pulleys E F G H $f$ $g$ are grooved, so as to fit into and engage one another. It will, however, be understood that gears or toothed wheels may be employed in lieu of these pulleys with quite the same result.

The feed-wheels E F, I have termed tension wheels or pulleys, inasmuch as their peripheries or outer parts are made separate from their hubs, and are so united therewith as to be capable, at certain times, of slipping thereon, so as to automatically cease to actuate the feed whenever the resistance to the movement of the cutting-tool in the direction of either the vertical or horizontal feed passes beyond a certain limit. This resistance may arise from the pattern which the tool is to follow, or otherwise; and the result of my arrangement is to cause the feed to automatically adapt itself to the various angles or sinuosities of the pattern, allowing a greater vertical feed than horizontal feed; or vice versa, according to the direction in which the tool is required to travel in order to follow the pattern. This construction of the feed-wheels is shown clearly in Fig. 4, in which the peripheral part $h$ of the wheel is annular, and is provided internally with a projecting rib, $i$, which is embraced between the hub proper, $j$, and a clamp-plate, $k$, fitting on the hub, and against the opposite side of the rib, the clamp and hub being united by screws or bolts and nuts, which can be tightened to cause the rib $i$ to be clasped with more or less pressure, as desired. The less the pressure the sooner will the part $h$ slip on the hub, when the shaft on which the latter is mounted requires more force to revolve it, in consequence of increased resistance offered to the feed of the tool horizontally or vertically, as the case may be.

In front of and about parallel with the face of frame A extend rails, upon which runs a wheeled truck or car, I′, upon which is a vertical stone-supporting plate or frame, J, whose base rests on and is held to the carriage by a bolt, $l$, passing up through the car, and a slot, $l'$, in the base of frame J. This bolt is provided with a screw-threaded upper end, having a nut, $m$. The frame can thus be adjusted nearer to or farther from the cutting mechanism, as desired, and then clamped in such position by tightening the nut $m$. At the ends of the frame, which project beyond the ends of the car, are hook-shaped dogs, $n$, hanging from the frame in slots $n^1$ therein, the hooked ends of the dogs extending under the ends of the car, and their upper ends projecting up through the slots $n^1$, screw-threaded, and provided with tightening-nuts $n^2$. The necks of the dogs, which pass through the slots, are cylindrical, so that they can turn, as well as slide longitudinally, therein.

The frame J can be turned on bolt $l$ as a center, so as to set its face at any angle in a vertical plane with respect to the cutting mechanism, and can then be held in such position by bringing the dogs $n$ into position and tightening up the nuts $n^2$.

The track on which the car runs may extend to any point desired, and the car can thus be used to bring the stone to the machine. After thus bringing the stone to the machine it is desirable to fasten the car in proper position in front of the cutting mechanism; and to this end I employ, in the portion of the track in front of the cutter, a V center rail, $o$, which is embraced by beveled clamps $o'$, sliding on a support, $p$, on the under side of the car. Through this support and the upper ends of the clamps $o'$ passes shaft $p'$, provided with cams $q$, fitting in apertures formed in the clamps. By rotating the shaft the cams $q$ are rotated, and can thus be caused to draw up the clamps and cause them to grasp firmly the center rail, or to lower the clamps, in which case they will release the center rail, and thus permit the car to be moved.

The stone or slab to be operated on is held on the vertical face of the plate J, or it may partly rest also on the car. The face of the plate J is provided with vertical and horizontal dovetailed grooves $J^1$ $J^2$, to receive the dogs by which the stone is held in place.

For the purpose of adapting the machine for turning columns, &c., I provide adjustable and detachable centers, as shown in Figs. 2 and 3, consisting each of a pedestal or upright piece, K, carrying the centers $r$, similar to those in turning-lathes, and provided with bolts $s$ terminating in dovetailed plates or feet $s^1$ fitting in the horizontal groove $J^2$ on plate J, and caused to clamp and hold the parts K in position by tightening the nuts $s^2$ on the other ends of said bolts. One of the centers is provided with a toothed wheel, L, meshing into a gear, L′, on the frame J, which is driven by suitable means. In this way the frame J may be fitted, whenever desired, with these adjustable centers, between which the stone to be turned into a column or other article can be held.

Having now described my invention and the manner in which the same is or may be carried into effect, what I claim, and desire to secure by Letters Patent, is—

1. The combination, with the tool-carriage and screw-threaded shafts for feeding the same vertically and horizontally, of the tension or feed pulleys imparting rotary movement to said shafts, and constructed and operating substantially as shown and described, so that at the times and under the conditions specified the peripheral portion of one or the other of said pulleys may slip on its hub, and thus permit the rotation of the feed-shaft driven by said pulley to be retarded for the purposes stated.

2. The feed or tension pulleys, in combination with the reversing-frogs, driving-pulleys, and cones for varying the relative speed of said driving-pulleys, arranged and operating together substantially as and for the purposes shown and set forth.

3. The stone-carrying truck or car, arranged to run on a track extending in front of the cutting devices, and combined with mechanism whereby it may be locked and fixed in position on the track in front of said cutting devices, substantially as shown and described.

4. The combination, with the truck or car, of the V center rail between the track-rails and the beveled clamps carried by said truck, and cam-shaft for operating the same, substantially as herein shown and set forth.

5. The upright stone-supporting plate or frame, supported and held on the truck or car, and adjustable thereon with respect to the cutting mechanism, substantially as herein shown and set forth.

6. The truck or car and stone-supporting plate, slotted to receive a bolt or pin which holds it to the truck, permits the said plate to be adjusted bodily toward and away from the cutter, and serves also as an axis upon which the plate may be turned to set its face at any desired angle in a vertical plane with respect to the cutter, in combination with end dogs on said adjustable plate for clamping it to the truck in the desired position, substantially as shown and set forth.

7. In combination with the upright stone-supporting plate, the adjustable and removable centers for turning columns and for similar work, substantially as herein shown and set forth.

In testimony whereof I have signed my name in the presence of two subscribing witnesses.

HERBERT COTTRELL.

Witnesses:
JOHN BULKLEY,
IRA M. TAYLOR.